(12) United States Patent
Chiang

(10) Patent No.: US 8,305,702 B2
(45) Date of Patent: Nov. 6, 2012

(54) VOICE COIL MOTOR, CAMERA MODULE HAVING SAME AND PORTABLE ELECTRONIC DEVICE HAVING SAME

(75) Inventor: Shun-Fan Chiang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 7 days.

(21) Appl. No.: 13/032,654

(22) Filed: Feb. 23, 2011

(65) Prior Publication Data

US 2012/0162790 A1 Jun. 28, 2012

(30) Foreign Application Priority Data

Dec. 22, 2010 (TW) .............................. 99145387 A

(51) Int. Cl.
*G02B 7/02* (2006.01)
(52) U.S. Cl. ........................................ 359/824; 359/694
(58) Field of Classification Search .................. 359/824
See application file for complete search history.

(56) References Cited

U.S. PATENT DOCUMENTS

2008/0285163 A1 * 11/2008 Kasuga et al. ................ 359/823
* cited by examiner

*Primary Examiner* — James Jones
(74) *Attorney, Agent, or Firm* — Altis Law Group, Inc.

(57) ABSTRACT

An exemplary voice coil motor includes a fixed body, a movable barrel, a number of upper rollers, and a number of lower rollers. The fixed body includes a first receiving cavity, a number of upper recesses, and a number of lower recesses. The upper recesses and lower recesses are respectively arranged at opposite ends of the fixed body, and communicate with the first receiving cavity. The movable barrel is movably received in the first receiving cavity. The upper rollers are engagingly received in the corresponding upper recesses, and engage with the movable barrel for applying first friction forces to the movable barrel. The lower rollers are engagingly received in the lower recesses, and engage with the movable barrel for applying second friction forces to the movable barrel.

20 Claims, 5 Drawing Sheets

VOICE COIL MOTOR, CAMERA MODULE HAVING SAME AND PORTABLE ELECTRONIC DEVICE HAVING SAME

BACKGROUND

1. Technical Field

The present disclosure relates to motors and particularly, to a voice coil motor, a camera module having the voice coil motor and a portable electronic device having such camera module.

2. Description of Related Art

With the development of optical imaging technology, camera modules are widely used in a variety of portable electronic devices, such as mobile phones, and personal digital assistants (PDAs).

Some portable electronic devices, for example, third generation (3G) mobile phones, include camera modules. The camera modules use actuators to provide zoom and autofocus, such as, for example, stepper motors. It is frequently necessary to use a gear assembly to transform the rotational movement of the actuators into linear movement. However, such gear assembly generally increases bulk of the camera modules. Furthermore, the occurrence of backlash/recoil in the gear assembly may degrade focus accuracy.

Therefore, what is needed is a motor and camera module using the new motor that can overcome the described limitations.

DETAILED DESCRIPTION

Figure 1:
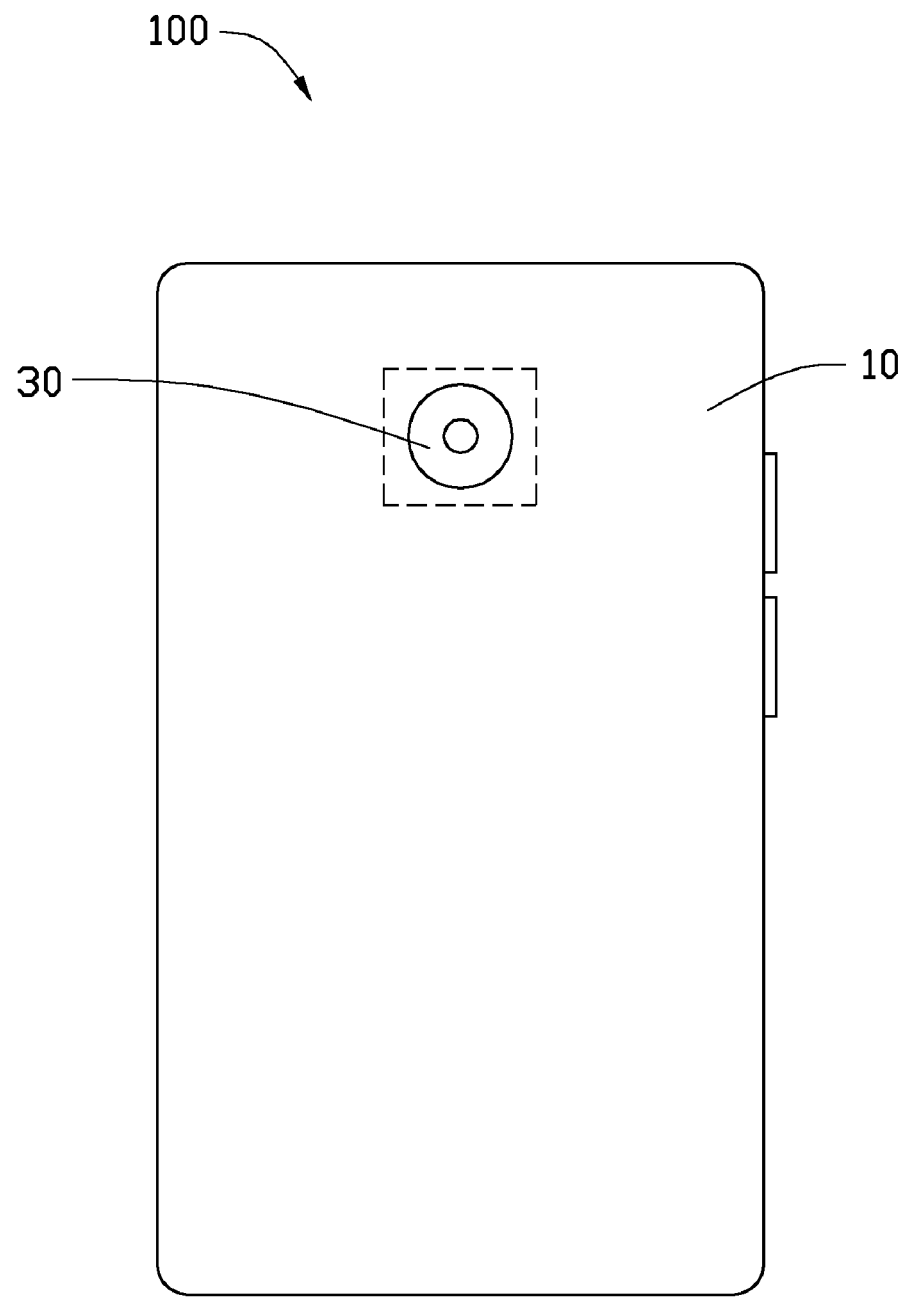
FIG. 1 is an isometric view of a portable electronic device according to a first embodiment.
Figure 2:
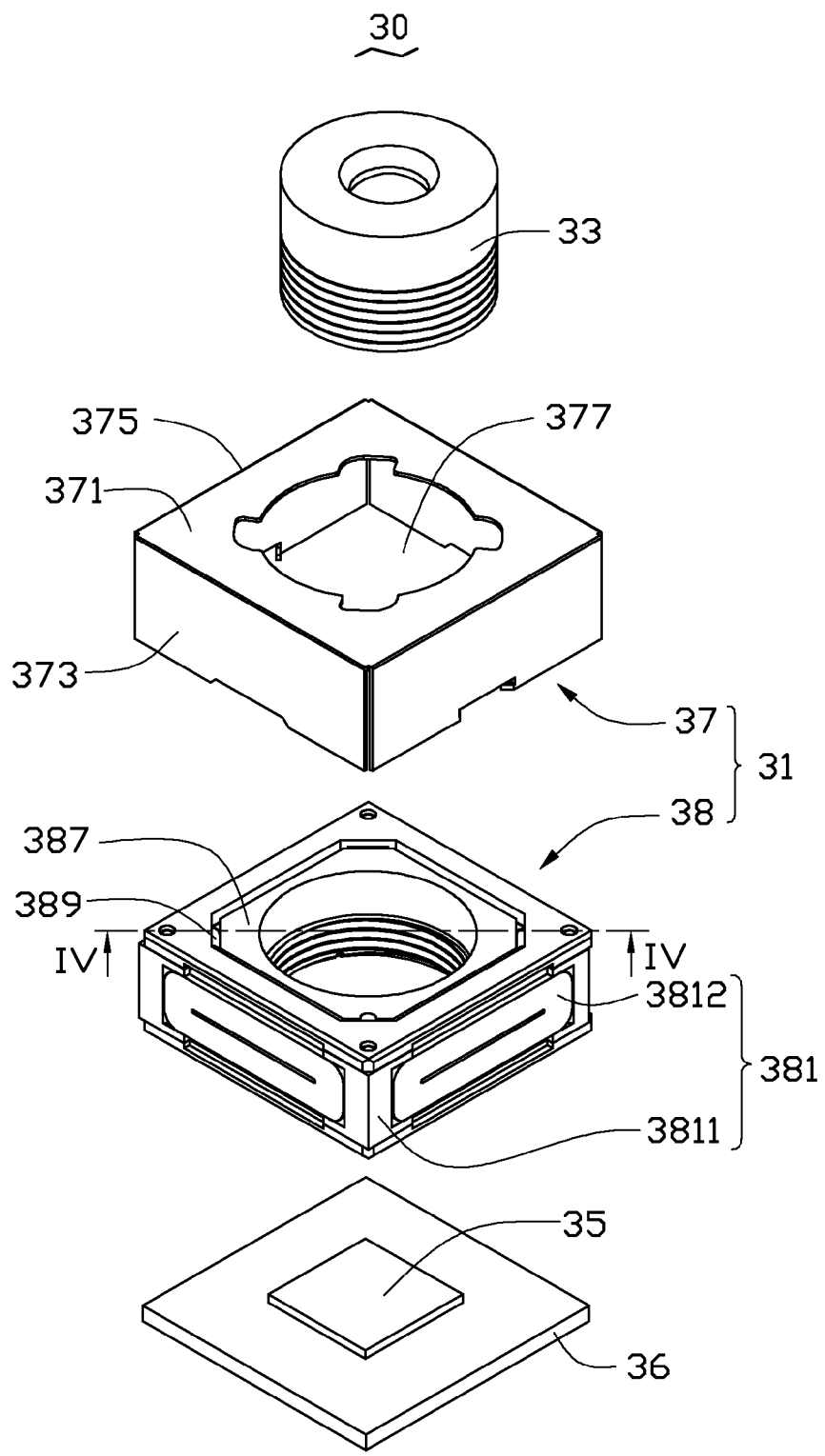
FIG. 2 is an exploded and isometric view of a camera module of the portable electronic device of FIG. 1, the camera module including a driving module.
Figure 3:
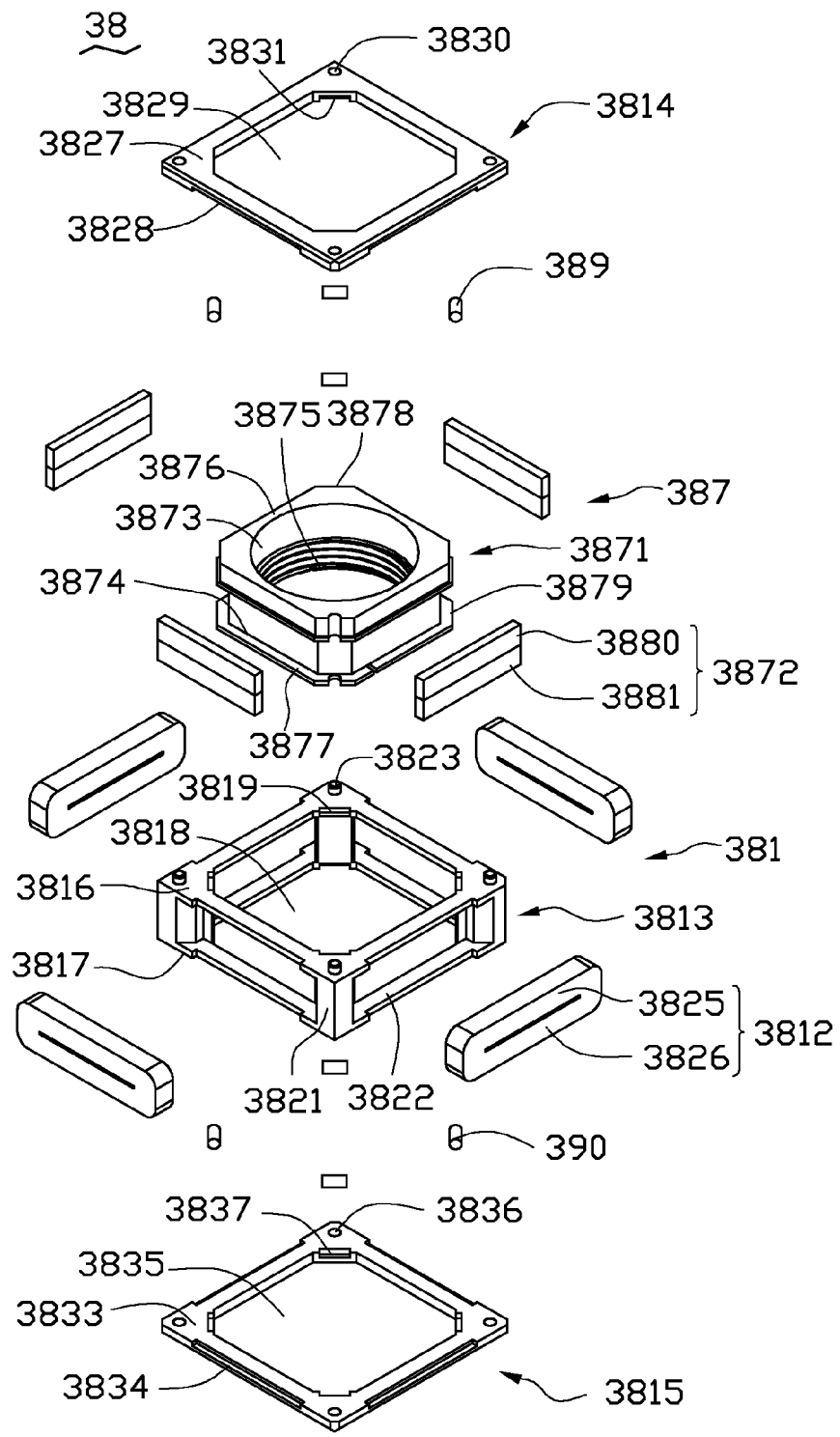
FIG. 3 is an exploded and isometric view of the driving module of the camera module of FIG. 2.
Figure 4:
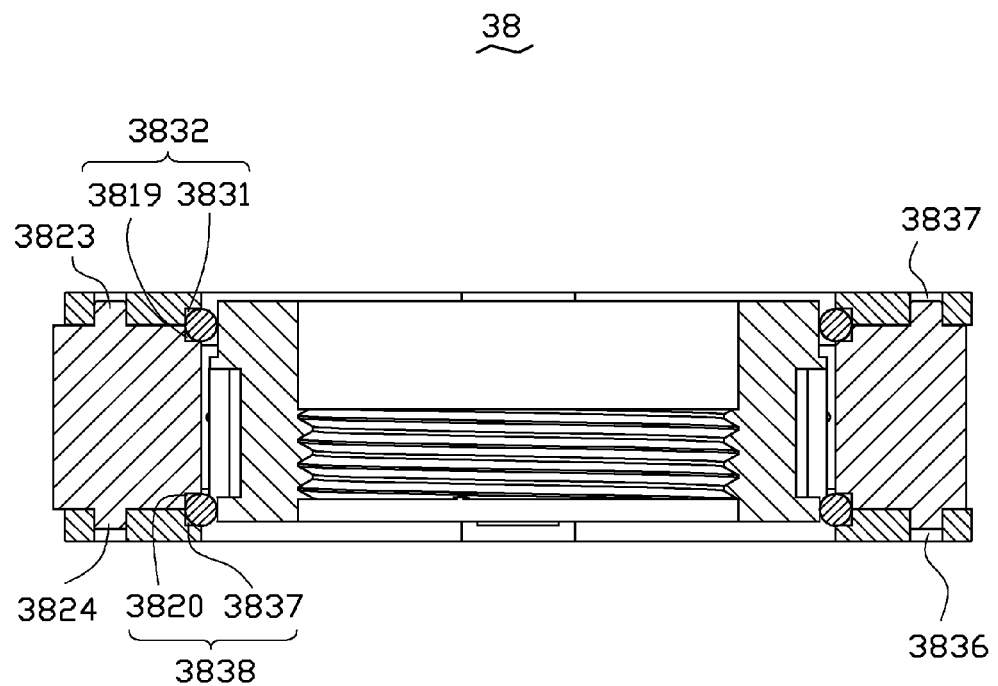
FIG. 4 is a cross-section of the driving module of the camera module of FIG. 2, taken along a line IV-IV thereof.

Embodiments will now be described in detail below with reference to drawings.

Referring to FIGS. 1-4, a portable electric device 100, in accordance with a first embodiment, is shown. The portable electric device 100 includes a main body 10, and a camera module 30 mounted on the main body 10.

The camera module 30 includes a voice coil motor 31, a lens barrel 33 receiving at least one lens therein, and an image sensor 35 mounted on a circuit board 36.

The voice coil motor 31 includes a shell 37, and a driving module 38 received in the shell 37.

The shell 37 is configured for protecting the lens barrel 33, the driving module 38 and the image sensor 35 from damage by impact. The shell 37 includes a top plate 371, two first side plates 373, and two second side plates 375. A through hole 377 is defined in the top plate 371, allowing light to pass therethrough. The top plate 371, the first side plates 373, and the second side plates 375 cooperatively define a receiving cavity (not labeled) for receiving the driving module 38 therein.

The driving module 38 includes a fixed unit 381, a movable unit 387, four upper rollers 389 for applying first friction forces to the movable unit 387, and four lower rollers 390 for applying second friction forces onto the movable unit 387.

The fixed unit 381 includes a fixed body 3811, and four coils 3812 arranged on the fixed body 3811.

The fixed body 3811 includes a fixed frame 3813 and a cover 3814, and support base 3815 respectively arranged on the two ends of the fixed frame 3813.

The fixed frame 3813 includes a top end 3816, a bottom end 3817 facing away from the top end 3816, a first receiving cavity 3818 passing through the upper end 3816 and the bottom end 3817, four first recess halves 3819, and four second recess halves 3820.

Each of the first recess halves 3819 is defined in the inner surface of the top end 3816, and exposed at the top end surface of the top end 3816. Each of the second recess halves 3819 is defined in the inner surface of the bottom end 3817, and exposed at the bottom end surface of the bottom end 3817.

In the present embodiment, the fixed frame 3813 is substantially hollow cubic, and includes four sidewalls 3821, four receiving cavities 3822 defined in the respective sidewalls 3821, four first locating members 3823 arranged on the top end surface of the top end 3816, and four second locating member 3824 arranged on the bottom end surface of the bottom end 3817. Each of the receiving cavities 3822 is configured for receiving one coil 3812. Each of the receiving cavities 3822 passes through the corresponding sidewall 3821, and communicates with the first receiving cavity 3818. The first locating member 3823 and the second locating member 3824 are locating pins.

In alternative embodiments, the fixed frame 3813 may be of other shapes, such as cylindrical, pentagonal, prismatic, or others. In further alternative embodiments, the receiving cavity 3822 may be replaced by a recess defined in the inner surface or outer surface of the sidewall 3821. In still further alternative embodiments, the first locating member 3823 may be of other structures, such as a pin, a recess, or others.

Each coil 1812 includes an upper portion 3825 and a lower portion 3826.

The cover 3814 includes an upper surface 3827, a lower surface 3828 facing away from the upper surface 3827, a through hole 3829 passing through the upper surface 3827 and the lower surface 3828, four third locating members 3830 spatially corresponding to the respective first locating members 3823, and four third recess halves 3831 spatially corresponding to the respective first recess halves 3819.

The third locating members 3830 contact the respective first locating members 3823, completing the cover 3814 and the fixed frame 3813 as a complete body. In the present embodiment, the third locating member 3830 is a hole. In other embodiments, the third locating member 3830 may be of other structures, such as a pin, a recess, or others.

Each of the third recess halves 3831 is defined in the inner surface of the lower end of the cover 3814, and exposed at the lower surface 3828. A third recess half 3831 and a first recess half 3819 cooperatively define an upper recess 3832 communicating with the first receiving cavity 3818. The upper recess 3832 is configured for receiving one upper roller 389.

The support base 3815 includes an upper surface 3833, a lower surface 3834 facing away from the upper surface 3833, a through hole 3835 passing through the upper surface 3833 and the lower surface 3834, four fourth locating members 3836 spatially corresponding to the respective second locating members 3824, and four fourth recess halves 3837 spatially corresponding to the respective second recess halves 3820.

The fourth locating members 3836 contact the respective second locating members 3824, thereby completing the support base 3815 and the fixed frame 3813 as a complete body.

In the present embodiment, the fourth locating member 3836 is a hole. In other embodiments, the fourth locating member 3836 may be of other structures, such as a pin, a recess, or others.

Each of the fourth recess halves 3837 is defined in the inner surface of the lower end of the support base 3815, and exposed at the upper surface 3833. A fourth recess half 3837 and a second recess half 3820 cooperatively define a lower recess 3838 communicating with the first receiving cavity 3818. The lower recess 3838 is configured for receiving one lower roller 390.

The movable unit 387 is substantially cubic, and received in the first receiving cavity 3818. The movable unit 387 is configured for receiving the lens barrel 33 therein. The movable unit 387 includes a movable barrel 3871 and four magnet groups 3872 arranged on the outer sidewall of the movable barrel 3871.

The movable barrel 3872 is substantially cubic, and includes a top end 3873, a bottom end 3874 facing away from the top end 3873, a second receiving cavity 3875 passing through the top end 3873 and the bottom end 3874, a top plate 3876 outwardly extending from the top end 3873 along the circumference of the second receiving cavity 3875, and a bottom plate 3877 outwardly extending from the bottom end 3874 along the circumference of the second receiving cavity 3875. In other embodiments, the movable barrel 3871 may be of other shapes, such as cylindrical, pentagonal prismatic, or others.

The top plate 3876 includes four top sections 3878 at the respective four corners thereof. In the present embodiment, each of the four top sections 3878 is parallel to the central axis of the second receiving cavity 3875, and contacts and resists one upper roller 389, such that the first friction force is generated between one upper roller 389 and one upper section 3878.

The bottom plate 3877 includes four lower sections 3879 at the respective four corners thereof. In the present embodiment, each of the four lower sections 3879 is parallel to the central axis of the second receiving cavity 3875, and is engaged with one lower roller 390, thereby completing the second friction force generated between one lower roller 390 and one lower section 3879. In alternative embodiments, the top sections 3878 may be omitted.

The four magnet groups 3872 are respectively arranged on the outer surfaces of the four sidewalls of the movable barrel 3871, between the top plate 3876 and the bottom plate 3877.

Each of the magnet groups 3872 is spatially opposite to a corresponding coil 3812, such that the movable unit 387 moves along the central axis of the first receiving cavity 3818 relative to the fixed frame 3813 by Lorenz Forces, generated by interactions between magnetic fields generated by the coils 3812 with current flowing therein and magnetic fields generated by the corresponding magnet groups 3872.

Each of the magnet groups 3872 includes an upper magnet 3880 spatially corresponding to the upper portion 3825, and a lower magnet 3881 spatially corresponding to the lower portion 3826. The N magnetic pole of the upper magnet 3880 faces the upper portion 3825, and the S magnetic pole of the upper magnet 3880 faces away from the upper portion 3825 or vice versa in other embodiments. The N magnetic pole of the lower magnet 3881 faces away from the lower portion 3826, and the S magnetic pole of the lower magnet 3881 faces the lower portion 3826 or vice versa in other embodiments.

The four upper rollers 389 are engagingly received in the upper recesses 3832, respectively. In the present embodiment, the upper rollers 389 are cylindrical rollers, perpendicular to the central axis of the second receiving cavity 3875. In alternative embodiments, the upper roller 389 may be a needle roller, spherical roller, tapered roller, or other type. In further alternative embodiments, the angle between the axial direction of each upper roller 389 and the central axis of second receiving cavity 3875 may be 45, 60, 75°, or other angle.

The four lower rollers 390 are similar to the four upper rollers 389, and engagingly received in the respective lower recesses 3838. In other embodiments, the four lower rollers 390 may be different from the four upper rollers 389.

In alternative embodiments, the upper recesses 3832 may be connected to each other, thereby forming a ring-shaped upper recess communicating with the first receiving cavity 3818, which is defined in the inner surface of the fixed frame 3813. In further embodiments, two, three, or more upper recesses 3832 may be formed. If two upper recesses 3832 are formed, arrangement thereof is on the diagonal of the fixed frame 3813, whereby the movable barrel 3871 gains equilibrium friction force.

In operation, when an image is incident on the image sensor 35, the Lorenz Force drives the movable barrel 3871 along the central axis of the first receiving cavity 3818 relative to the fixed frame 4813. Because the upper rollers 389 and the lower rollers 390 contact and resist the movable barrel 3871, the upper rollers 389 and the lower rollers 390 rotate with the movement of the movable barrel 3871 along the central axis of the first receiving cavity 3818. When focus is complete, the first and second friction forces between the upper and lower rollers 389, 390 and the movable barrel 3871 are sufficient to cooperatively retain the movable barrel 3871 in the fixed body 4813 (i.e. the first and second friction forces maintain the movable barrel 3871 in the optimum capture position), and capture is complete. No current is required to coils 3812 when focus is complete, and energy is conserved.

The image sensor 35 is electrically connected to the printed circuit board 36 securely mounted on the main body 10 and configured for converting an optical image to an electrical signal.

Figure 5:
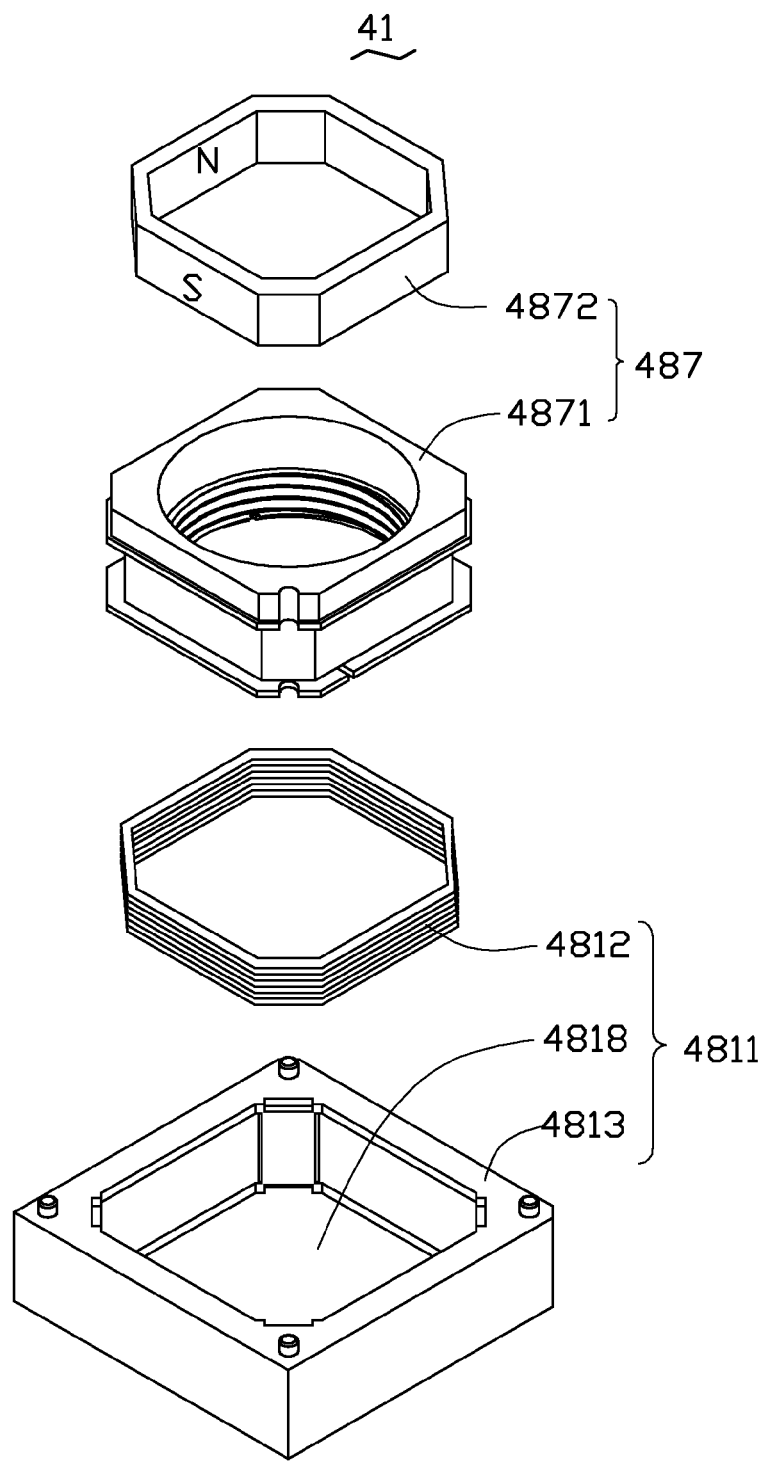
FIG. 5 is an exploded and isometric view of a voice coil motor according to a second embodiment.

Referring to FIG. 5, a voice coil motor 41, in accordance with a second embodiment, is shown. The voice coil motor 41 includes a fixed body 4811 and a movable unit 487.

The fixed body 4811 includes a fixed frame 4813 having a first receiving cavity 4818, and a coil 4812 on the fixed frame 4813. The coil 4812 is coaxial with the first receiving cavity 4818, and is arranged on the inner surface of the fixed frame 4813.

The movable unit 487 includes a movable barrel 4871 received in the first receiving cavity 4818 and a ring-shaped magnet 4872 mounted on the outer sidewall of the movable barrel 4871.

In the present embodiment, the S magnetic pole of the ring-shaped magnet 4872 faces the coil 4812, and the N magnetic pole of the ring-shaped magnet 4872 faces away from the coil 4812. In other embodiments, the ring-shaped magnet 4872 may be cut into two, three, or more magnets.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A voice coil motor comprising:
a fixed body, the fixed body comprising a first receiving cavity, at least one upper recess, and at least one lower recess, the at least one upper recess and the at least one lower recess being respectively arranged at opposite ends of the fixed body, and communicating with the first receiving cavity;
a movable barrel received in the first receiving cavity and movable relative to the fixed body;
at least two upper rollers engagingly received in the at least one upper recess, the at least two upper rollers engaged with the movable barrel, and configured for applying first friction forces to the movable barrel; and
at least two lower rollers engagingly received in the at least one lower recess, the at least two lower rollers engaged with the movable barrel, and configured for applying second friction forces onto the movable barrel, the first and second friction forces being sufficient to cooperatively retain the movable barrel in the fixed body.

2. The voice coil motor of claim 1, wherein the fixed body comprises a fixed frame, a cover, and a support base, the fixed frame comprises a top end, and a bottom end facing away from the top end, the first receiving cavity is defined in the fixed frame, and passes through the top end and the bottom end of the fixed frame, and the cover and the support base are respectively arranged on the top and bottom ends of the fixed frame.

3. The voice coil motor of claim 2, wherein the upper recess consists of a first recess half and a second recess half, the first recess half is defined in the inner surface of the top end of the fixed frame, and exposed at the top end surface of the top end of the fixed frame, and the second recess half is defined in the inner surface of the cover, and exposed at the lower surface of the cover.

4. The voice coil motor of claim 3, wherein the bottom recess consists of a third recess half and a fourth recess half, the third recess half is defined in the inner surface of the bottom end of the fixed frame, and exposed at the bottom end surface of the bottom end of the fixed frame, and the fourth recess half is defined in the inner surface of the support base, and exposed at the upper surface of the support base.

5. The voice coil motor of claim 3, further comprising at least one coil arranged on the fixed frame and at least one magnet on the outer wall of the movable barrel.

6. The voice coil motor of claim 3, wherein each of the upper rollers is a cylindrical roller.

7. The voice coil motor of claim 6, wherein the movable barrel comprises a second receiving cavity, and each upper roller is perpendicular to the central axis of the second receiving cavity.

8. The voice coil motor of claim 3, wherein the at least one upper recess is a ring-shaped recess.

9. A camera module comprising:
a lens barrel, and
a voice coil motor for driving the lens barrel to move, the voice coil motor comprising:
a fixed body, the fixed body comprising a fixed frame, a cover, a support base, a first receiving cavity, at least one upper recess, and at least one lower recess, the at least one upper recess and the at least one lower recess being respectively arranged at opposite ends of the fixed body, and communicating with the first receiving cavity, the fixed frame comprising a top end, and a bottom end facing away from the top end, the first receiving cavity being defined in the fixed frame, and passing through the top end and the bottom end of the fixed frame, the cover and the support base being respectively arranged on the top and bottom ends of the fixed frame, the at least one upper recess consisting of a first recess half and a second recess half, the first recess half being defined in the inner surface of the top end of the fixed frame, and exposed at the top end surface of the top end of the fixed frame, and the second recess half being defined in the inner surface of the cover, and exposed at the lower surface of the cover;
a movable barrel movably received in the first receiving cavity;
at least two upper rollers engagingly received in the at least one upper recess, the at least two upper rollers engaged with the movable barrel, and configured for applying first friction forces to the movable barrel; and
at least two lower rollers engagingly received in the at least one lower recess, the at least two lower rollers engaged with the movable barrel, and configured for applying second friction forces onto the movable barrel, the first and second friction forces being sufficient to cooperatively retain the movable barrel in the fixed body.

10. The camera module of claim 9, wherein the bottom recess consists of a third recess half and a fourth recess half, the third recess half is defined in the inner surface of the bottom end of the fixed frame, and exposed at the bottom end surface of the bottom end of the fixed frame, and the fourth recess half is defined in the inner surface of the support base, and exposed at the upper surface of the support base.

11. The camera module of claim 9, wherein the voice coil motor further comprises at least one coil arranged on the fixed frame and at least one magnet on the outer wall of the movable barrel.

12. The camera module of claim 9, wherein each of the upper rollers is a cylindrical roller.

13. The camera module of claim 12, wherein the movable barrel comprises a second receiving cavity, and each upper roller is perpendicular to the central axis of the second receiving cavity.

14. A portable electric device comprising:
a main body, and
a camera module mounted on the main body, the camera module comprising:
a lens barrel, and
a voice coil motor for driving the lens barrel to move, the voice coil motor comprising:
a fixed body,
the fixed body comprising a fixed frame, a cover, a support base, a first receiving cavity, at least one upper recess, and at least one lower recess, the at least one upper recess and the at least one lower recess being respectively arranged at opposite ends of the fixed body, and communicating with the first receiving cavity, the fixed frame comprising a top end, and a bottom end facing away from the top end, the first receiving cavity being defined in the fixed frame, and passing through the top end and the bottom end of the fixed frame, the cover and the support base being respectively arranged on the top and bottom ends of the fixed frame, the at least one upper recess consisting of a first recess half and a second recess half, the first recess half being defined in the inner surface of the top end of the fixed frame, and exposed at the top end surface of the top end of the fixed frame, and the second recess half being defined in the inner surface of the cover, and exposed at the lower surface of the cover;

a movable barrel movably received in the first receiving cavity;

at least two upper rollers engagingly received in the at least one upper recess, the at least two upper rollers engaged with the movable barrel, and configured for applying first friction forces to the movable barrel, and at least two lower rollers engagingly received in the at least one lower recess, the at least two lower rollers engaged with the movable barrel, and configured for applying second friction forces onto the movable barrel, the first and second friction forces being sufficient to cooperatively retain the movable barrel in the fixed body.

15. The portable electric device of claim 14, wherein the bottom recess consists of a third recess half and a fourth recess half, the third recess half is defined in the inner surface of the bottom end of the fixed frame, and exposed at the bottom end surface of the bottom end of the fixed frame, and the fourth recess half is defined in the inner surface of the support base, and exposed at the upper surface of the support base.

16. The voice coil motor of claim 9, wherein the at least one upper recess is a ring-shaped recess.

17. The voice coil motor of claim 14, wherein the at least one upper recess is a ring-shaped recess.

18. The camera module of claim 14, wherein the voice coil motor further comprises at least one coil arranged on the fixed frame and at least one magnet on the outer wall of the movable barrel.

19. The camera module of claim 14, wherein each of the upper rollers is a cylindrical roller.

20. The camera module of claim 19, wherein the movable barrel comprises a second receiving cavity, and each upper roller is perpendicular to the central axis of the second receiving cavity.

* * * * *